(12) United States Patent
Kim et al.

(10) Patent No.: US 8,273,319 B1
(45) Date of Patent: Sep. 25, 2012

(54) ENRICHMENT OF SPECIFIC CHIRALITY SINGLE WALL CARBON NANOTUBES WITH GENOMIC DNA

(75) Inventors: Sang N. Kim, Dayton, OH (US); Rajesh R. Naik, Dayton, OH (US); James G. Grote, Yellow Springs, OH (US); Barry L. Farmer, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/843,182

(22) Filed: Jul. 26, 2010

Related U.S. Application Data

(60) Provisional application No. 61/228,197, filed on Jul. 24, 2009.

(51) Int. Cl.
*D01F 9/12* (2006.01)

(52) U.S. Cl. ............ 423/447.1; 977/746; 977/845; 977/847; 423/460

(58) Field of Classification Search .... 423/447.1–447.3, 423/445 B; 977/742–754, 842–848
See application file for complete search history.

(56) References Cited

U.S. PATENT DOCUMENTS

2005/0009039 A1* 1/2005 Jagota et al. ............ 435/6
2006/0040381 A1* 2/2006 Zhao et al. ............ 435/287.9

OTHER PUBLICATIONS

Kim, et al., Enrichment of (6,5,) Single Wall Carbon Nanotubes Using Genomic DNA, Nano Letters 2008; 8(12): 4415-4420.*
Bachilio, et al., Narrow (n,m)-Distribution of Single-Walled Carbon Nanotubes Grown Using a Solid Supported Catalyst, J. Am. Chem. Soc. 2003; 125: 11186-11187.*
Kim, et al., Solubilization of Single Wall Carbon Nanotubes with Salmon Sperm DNA, NSTI-Nanotech 2008 ISBN 978-1-4200-8503-7 vol. 1, pp. 132-.*

* cited by examiner

*Primary Examiner* — Daniel C. McCracken
(74) *Attorney, Agent, or Firm* — AFMCLO/JAZ; Fredric Snider

(57) ABSTRACT

An improved method for enriched chirality of single wall carbon nanotubes is described. Genomic DNA, particularly salmon DNA (SaDNA) is shown to sort out single wall carbon nanotubes of specific chirality by a process of solubilization (dissolving in solution) and separation (such as centrifuging), without requiring more complex processes such as anion exchange chromatography. A possible reason for enhanced chirality separation using DNA may be attributed to its lowered GC (guanine-cytosine) content.

4 Claims, 3 Drawing Sheets

ENRICHMENT OF SPECIFIC CHIRALITY SINGLE WALL CARBON NANOTUBES WITH GENOMIC DNA

CROSS REFERENCE TO RELATED PATENT APPLICATION

This application claims priority under 35 U.S.C. §119(e) from U.S. provisional application 61/228,197, filed Jul. 24, 2009, and titled "Enrichment of Specific Chirality Single Wall Carbon Nanotubes with Genomic DNA." The invention description contained in that provisional application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to separation and sorting of carbon nanotubes according to desired properties, and more specifically to enriching the chirality of genomic single wall carbon nanotubes using DNA.

Single wall carbon nanotubes (SWNTs) have attracted significant attention because of their potential in a vast range of applications, including nanoscale circuits, conductors, electrochemical probes, transistors and photovoltaic devices. In order to achieve optimal performance of SWNTs for real-world electronic applications, the diameter, type and chirality have to be effectively sorted. Any process for sorting SWNTs has to be scalable, non-destructive and economical.

Separating nanotubes according to desired properties is still proving a challenging task, especially single-walled carbon nanotube sorting, because the composition and chemical properties of SWNTs of different types are very similar, making conventional separation techniques difficult and inefficient.

Prior art separation techniques for SWNTs rely on preferential electron transfer on metallic SWNTs treated with diazonium salts, dielectrophoresis, enhanced chemical affinity of semiconducting SWNTs with octadecylamine, and wrapping of SWNTs with single-stranded DNA. The selectivity of these methods can be further enhanced by vigorous centrifugation of prepared dispersions and the use of ion-exchange chromatography (IEX).

In 2003, Ming Zheng of DuPont and coworkers found that DNA strands could be used to separate CNTs according to their electronic characteristics. The discovery was reported in articles in Science ("Structure-Based Carbon Nanotube Sorting by Sequence-Dependent DNA Assembly") and Nature ("DNA-assisted dispersion and separation of carbon nanotubes") and cited later by Forbes magazine as one of the top five nanotechnology breakthroughs of 2003.

The DuPont team discovered an oligonucleotide sequence (that is, a short, single-stranded nucleic acid fragment, in this case a $d(GT)_{20}$ oligomer DNA sequence) that self-assembles into a helical structure around individual nanotubes, creating DNA-CNT hybrids with electrostatic properties that depend on tube diameter and electrical properties. CNTs can be separated on the basis of these electrostatic properties using anion exchange chromatography. The separation of metallic and semiconducting nanotubes was improved compared with other techniques, and separation on the basis of tube diameter became possible.

The price for $d(GT)_{20}$ is typically $25,000/gm and usually oligo-DNA assisted SWNT dispersion experiments are carried out with a DNA:SWNT weight ratio of 1:1, discarding the majority of unbound DNA. This poses a high price of $25,000 for oligo-DNA in treating every gm of carbon nanotubes, and thus, a cost-effective nucleic acid system is highly in demand.

It is seen, therefore, that there is a need for less expensive, as well as less complex, processes for separation and sorting of carbon nanotubes, particularly on the basis of chirality.

SUMMARY OF THE INVENTION

The present invention provides a new method for enriching or enhancing the chirality of single wall carbon nanotubes using complete double stranded genomic DNA instead of specific DNA fragments.

One of the unique discoveries of the present invention is that genomic DNA (such as salmon DNA (SaDNA)) sorts out single wall carbon nanotubes of specific chirality by a process of solubilization (dissolving in solution) and separation (such as centrifuging), without requiring more complex processes such as anion exchange chromatography.

Using SaDNA, a byproduct of the fishing industry, >86% of (6,5) SWNT-enrichment is achieved using commercial CoMoCat™ tubes as the starting material, a significant advance in efficiency with a much lower cost material and, as stated earlier, without requiring complex processes such as anion exchange chromatography.

Another unique discovery of the present invention is that one of the reasons for enhanced separation of (6,5) SWNTs using SaDNA may be attributed to its lowered GC (guanine-cytosine) content.

Accordingly, the invention is directed to a method for enhancing the single chirality (6,5) tube separation of single wall carbon nanotubes, comprising the steps of solubilization and separation using salmon DNA.

The invention is also directed to a method for enhancing the chirality separation of carbon nanotubes, comprising the steps of solubilization and separation using DNA having a guanine-cytosine content of less than 50%.

The invention is further directed to a plurality of single wall carbon nanotubes having a single chirality (6,5) tube concentration of at least 86%.

DETAILED DESCRIPTION

Figure 1:
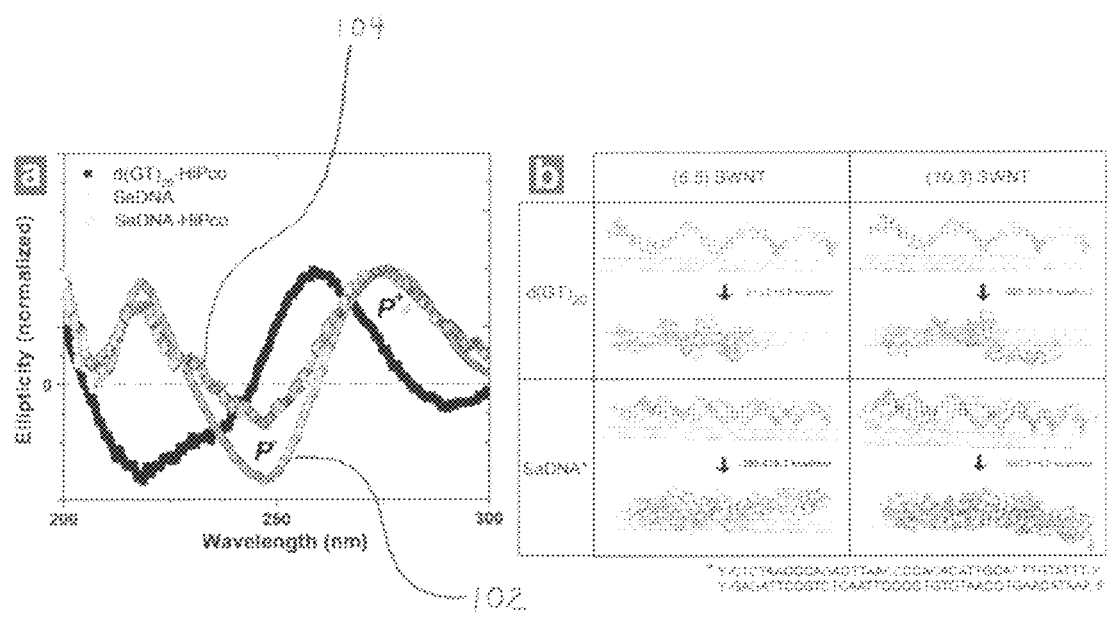
FIG. 1a is a normalized CD spectrum from SaDNA and $d(GT)_{20}$ dispersed HiPco™ SWNTs. The SaDNA CD spectrum shows complete B-form. The negative and positive peaks at 290-260 nm and 260-230 nm are noted as $P_+$ and $P_-$, respectively.
FIG. 1b shows tabulated figures for the conformations of SaDNA/$d(GT)_{20}$ and (6,5)-/(10,3)-SWNT hybrids obtained from classical all-atom MD simulations. Transitions of conformations from native DNAs to energy-minimized DNA-SWNT hybrid forms are indicated as arrows along with the vdW energies between DNA and SWNT of the energy-minimized system.

Additional details of the work described in this description, particularly references to works describing the experimental techniques used in this description, are in Sang Kim, Zhifeng Kuang, James G. Grote, Barry L. Farmer, and Rajesh R. Naik, *Nano Letters*, Vol. 8, No. 12, pp 4415-4420 (2008); S. N. Kim, K. M. Singh, F. Ouchen, J. G. Grote and R. R. Naik, NSTI-Nanotech 2008 Conference, Vol. 1, pp. 132-135 (2008); and, in supporting information for the *Nano Letters* paper available online from ACS Publications, the publications arm of the American Chemical Society. All three references are included in cross-referenced U.S. provisional application 61/228,197, filed Jul. 24, 2009, and are incorporated into this description as though fully re-written.

The inventors have discovered that genomic double stranded SaDNA prefers to interact with (6,5) SWNT as compared to (10,3) tubes, and, that single stranded $d(GT)_{20}$ shows no or minimal chirality preference.

As discussed in this description and in the papers referenced at the beginning of this description, additional separation methods such as anion exchange column and density gradient ultracentrifugation are necessary for the enrichment of (6,5) tubes when CoMoCat™ SWNTs were dispersed in water using, respectively, DNA oligo $d(GT)_{20}$ and sodium cholate. The present invention uses selective stabilization of SaDNA of HiPco™ SWNTs, and the enrichment of (6,5) SWNTs from as-supplied CoMoCat™ samples using SaDNA as a dispersing media in $D_2O$, without the need for additional separation methods.

Using SaDNA, a byproduct of the fishing industry, >86% of (6,5) SWNT-enrichment is achieved using commercial CoMoCat™ tubes as the starting material, a significant advance in efficiency with a much lower cost material. The inventors also used *Escherichia coli* genomic DNA (EcDNA) to separate CoMoCat™ SWNTs. Using EcDNA, the inventors were able to enrich (6,5) SWNTs only to ~75%, as opposed to >86% using SaDNA.

Additionally, the inventors have discovered that one of the reasons for enhanced separation of (6,5) SWNTs using SaDNA may be attributed to its lowered GC (guanine-cytosine) content of 41%, while in comparison, the GC content of EcDNA is around 50%.

As discussed, single wall carbon nanotubes (SWNTs) have attracted attention because of their potential in a vast range of applications, including transistors, and sensors. However, immense technological importance lies in enhancing the purity and homogeneity of SWNTs with respect to their chirality for real-world electronic applications. In order to achieve optimal performance of SWNTs, the diameter, type and chirality have to be effectively sorted. Any employed strategy for sorting SWNT has to be scalable, non-destructible and economical. A solubilization and chirality enrichment study of commercially available SWNTs using genomic DNA, based on a comparison of photoluminescence (PL) and near infrared (NIR) absorption measurements from the SWNTs dispersed with salmon genomic DNA (SaDNA) and $d(GT)_{20}$, showed that genomic DNA specifically enriches (6,5) tubes. Circular dichroism and classical all-atom molecular dynamics (MD) simulations revealed that the genomic double-stranded SaDNA prefers to interact with (6,5) SWNT as compared to (10,3) tubes, while single-stranded $d(GT)_{20}$ showed no or minimal chirality preference.

The enrichment process of the present invention demonstrates enrichment of >86% of (6,5) SWNT from CoMoCat™ nanotubes using SaDNA.

To theoretically explore these observations, namely that (6,5) SWNT exhibits strong association affinity to SaDNA, while no such chiral selectivity is present for $d(GT)_{20}$-SWNT complexes, a classical all-atom molecular dynamics (MD) simulation was performed to compare the relative binding affinity of single strand $d(GT)_{20}$ and double strand SaDNA to two representative SWNTs, (6,5) and (10,3) tubes. Because the self-assembly of DNA-SWNT complex is driven by the strong van der Waals (vdW) interaction on the interface of the nucleotides and the SWNT sidewall, and the vdW interaction is the main stabilizing force within the DNA-SWNT complex, this vdW interaction energy was calculated as between DNA and SWNT in vacuum to compare the relative binding affinity. Based on the known GC content of SaDNA or ~41%, a sequence of DNA, consisting 40 base-pairs with length ~13.5 nm, was randomly generated. An AMBER99 force field was used to model DNA. The initial coordinates of SWNTs of length 14 nm and chirality (6,5) and (10,3) were generated by using Maruyama's wrapping program. The SWNT carbon atoms were modeled by uncharged $sp^2$ Lennard-Jones parameters from the AMBER99 force field. The DNA structures were initially placed above the SWNT by about 1.5 nm from the axis of SWNT. After energy minimization and heating up to 300 K, each system was equilibrated at least 50 ns until the total potential energy converged. Using equilibrated trajectories, vdW interaction energies were calculated by NAMD for each system.

FIG. 1b shows the conformations of SaDNA and $d(GT)_{20}$ DNA fragments with (6,5)- and (10,3)—SWNTs obtained from classical all-atom MD simulations. The single strand $d(GT)_{20}$ rapidly wraps nanotubes from 3'-end as shown in FIG. 1b. This is in agreement with the observation from the classical all-atom MD simulations including explicit water as reported by Klein's group. FIG. 1b also shows double-strand DNA becomes more compact, exhibiting the A-like form. This trend fits well with the CD spectrum shift from complete B-form (curve 102 in FIG. 1a) to a near-A-form (curve 104 in FIG. 1a). Because DNA is flexible and hydrophilic, the interactions with the stiff and hydrophobic SWNT forces hydrophilic nucleotides to choose a more compact form.

The calculated vdW interaction energies between DNA and SWNT (its absolute value is also called the total stacking energy) for the energy-minimized conformations are −392.4±6.3 kcal/mol for SaDNA-(6,5), −330.3±6.0 kcal/mol for SaDNA-(10,3), −312.97±5.8 kcal/mol for $d(GT)_{20}$-(6,5), and −325.63±5.4 kcal/mol for $d(GT)_{20}$-(10,3). SaDNA energetically prefers (6,5) to (10,3) with an energy difference of 62.1 kcal/mol. Meanwhile, $d(GT)_{20}$ shows a preference toward (10,3) tube with −12.26 kcal/mol vdW energy difference, which is in the regime of error bars in the energy distributions. This theoretical calculation strongly supports the selective enrichment of (6,5)-tube with genomic SaDNA and no distinguishable observation with $d(GT)_{20}$.

Radial breathing mode (RBM) peaks from resonance Raman spectra (RRS) acquired using 633 nm excitation laser line show that relative intensity of SaDNA-HiPco™ sem-SWNT peaks are increased as compared to the $d(GT)_{20}$-HiPco, which shows similar RBM profiles to the as-supplied sample. This indicates that SaDNA mediates preferential stabilization of sem-SWNTs in the aqueous supernatant, while leaving metallic (met-) counterpart in the precipitate. Further detailed RRS characterization with tunable excitation laser line is required to monitor this metallicity-dependent separation. The present invention, however, focuses on characterizing the chirality separation of sem-SWNTs.

To further support that SaDNA significantly interacts with (6,5) SWNTs, similar experiments using CoMoCat™ SWNTs were explored.

Figure 2:
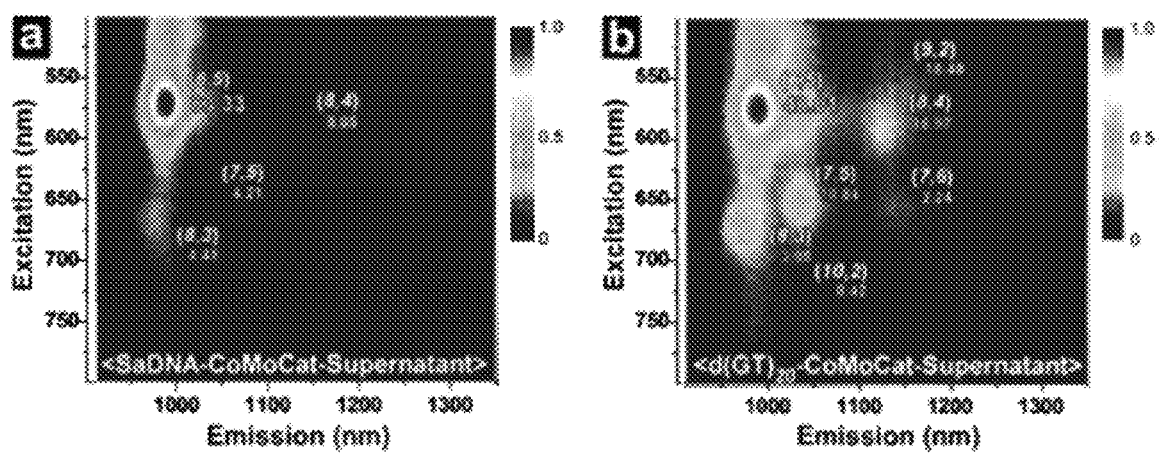
FIG. 2 is a normalized PLE emission contour plot of (a) SaDNA and (b) $d(GT)_{20}$ dispersed CoMoCat™ SWNTs from their ultracentrifugation supernatant fractions. The $RF_{SaDNA/d(GT)_{20}}^{PL}$ are shown under each chirality (n,m) assignment.

CoMoCat™ SWNT is a well-known commercial product, where the average diameter of nanotube is ~0.81 nm with a of ±0.08 nm. The estimated quantity of sem-SWNTs in CoMoCat™ tubes is >90% and (6,5) tube concentration reaches >50% of the total sample. Previously, additional separation methods such as anion exchange column and density gradient ultracentrifugation were employed for the enrichment of (6,5) tube when CoMoCat™ SWNTs were dispersed in water using DNA oligo $d(GT)_{20}$ and sodium cholate, respectively. Following the teachings of the present invention, the selective stabilization trend of SaDNA towards HiPco™ SWNTs, and the enrichment of (6,5) SWNT from as-supplied CoMoCat™ samples using SaDNA as a dispersing media in $D_2O$ without the need for additional separation methods, can be shown. FIG. 2b shows the PLE emission profile obtained from CoMoCat™ SWNTs using SaDNA and $d(GT)_{20}$. The normalized PLE emission intensity from (6,5) tubes is enhanced, while other SWNT peaks are significantly diminished, as is notable from the RF changes indicated in the FIG. 4 next to chirality assignment. Referring to the manufacturer's specification and their PLE emission- and RRS-based chirality quantification studies, the estimated (6,5) SWNT concentration in the CoMoCat™ sample increased to >86% with one-step of SaDNA mediated dispersion and ultracentrifugation. The addition of ultrasonicated and ultracentrifuged SaDNA to $d(GT)_{20}$ stabilized CoMoCat™ SWNTs shows no noticeable change in the PLE emission profiles, as shown in FIG. 2, confirming that the spectral difference is not due to SaDNA induced physicochemical changes in nanotubes.

Figure 3:
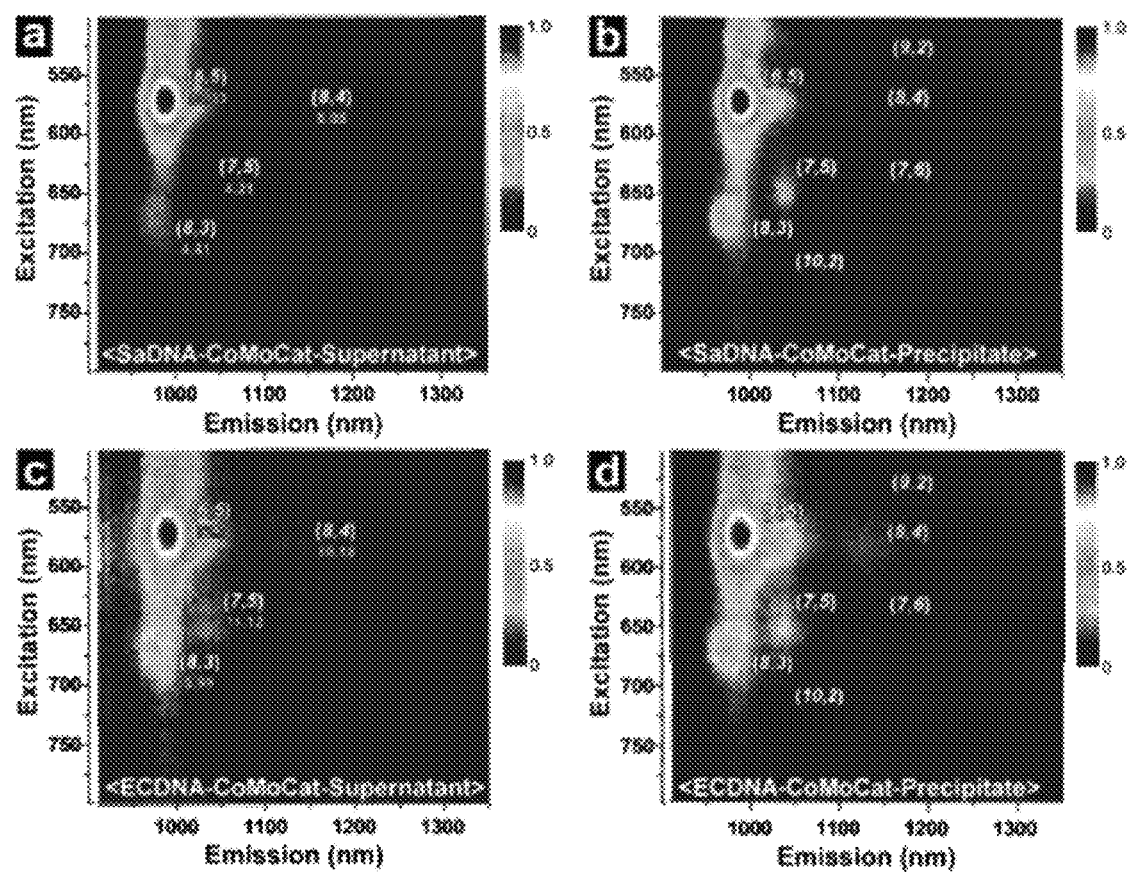
FIG. 3 is a normalized PLE emission contour plot of the ultracentrifuged supernatant and the redispersed-precipitate fractions from (FIGS. 3a and 3b) SaDNA (41% GC) and (FIGS. 3c and 3d) EcDNA (50% GC) dispersed CoMoCat™ SWNTs in $D_2O$.

*Escherichia coli* genomic DNA (EcDNA) was also used to separate CoMoCat™ SWNTs, as shown in FIG. 3. Using EcDNA, an enrichment of (6,5) SWNTs to ~75% was observed. One of the reasons for enhanced separation of (6,5) SWNTs using SaDNA may be attributed to its lowered GC (guanine-cytosine) content of 41%, while in comparison, the GC content of EcDNA is around 50%. Interestingly, PLE emission spectra from CoMoCat™ showed that the luminescence from (6,5) tubes is relatively stronger using the lower GC content genomic SaDNA, compared to EcDNA. In addition, EcDNA exhibited lower SWNT solubilization compared to SaDNA.

Additional analysis on near infrared (NIR) absorption and photoluminescence (PL) spectra from the HiPco™ nanotube samples, described in detail in the papers in the cross-referenced provisional application, shows SaDNA mediates selective stabilization of (6,5) SWNT, without requiring additional separation steps, such as ion exchange and density gradient columns. Circular dichroism and classical all-atom molecular dynamics (MD) simulations show that SaDNA prefers to interact with (6,5) SWNT as compared to (10,3) tubes, whereas single-stranded $d(GT)_{20}$ shows no or minimal chirality preference. Further spectroscopic studies on CoMoCat™ SWNT-DNA dispersion shows >86% of (6,5) chirality enrichment can be achieved by using SaDNA as the dispersing media.

The teachings of the present invention demonstrate that genomic DNAs have emerged as a SWNT dispersing system to satisfy an increasing demand. NIR, PL and MD studies reveal that SaDNA interacts with SWNT at a level comparable to or better than the $d(GT)_{20}$ oligomer, but more importantly, exhibits (6,5)-chirality selectivity. Using SaDNA, >86% of (6,5) SWNT-enrichment is achieved using commercial CoMoCat™ tubes as the starting material. This finding will enable more electronically controlled samples of SWNTs that can be used to enhance optical and semiconducting properties of nanotube-only systems or nanotubes composites, particularly for electronics applications. The present invention demonstrates a simple, scalable, and economic method for the enrichment of specific type SWNTs.

The disclosed new methods for enhanced separation and sorting of single wall carbon nanotubes successfully demonstrates the use of genomic DNA. Although the disclosed example embodiments are specialized, their teachings will find application in related areas where unique properties of specific genomic DNAs can be used for improved separation and sorting of both single wall carbon nanotubes and other materials.

Various modifications to the invention as described may be made, as might occur to one with skill in the art of the invention, within the scope of the claims. Therefore, all contemplated embodiments have not been shown in complete detail. Other embodiments may be developed without departing from the spirit of the invention or from the scope of the claims.

We claim:

1. A method for enhancing single chirality (6,5) tube separation of single wall carbon nanotubes, comprising the steps of:
    (a) mixing single wall carbon nanotubes with salmon DNA into a solution; and,
    (b) separating the solution into a precipitate and a supernatant, whereby the supernatant has enhanced enrichment of (6,5) tubes.

2. A method for enhancing single chirality (6,5) tube separation of single wall carbon nanotubes; comprising the steps of:
    (a) mixing single wall carbon nanotubes with salmon DNA into a solution; and,
    (b) separating the solution into a precipitate and a supernatant, whereby the supernatant has enhanced enrichment of (6,5) tubes; and,
    (c) wherein the salmon DNA has a guanine-cytosine content of less than 50%.

3. A method for enriching single chirality (6,5) single wall carbon nanotubes, comprising the steps of:
    (a) mixing single wall carbon nanotubes with genomic DNA into a solution; and,
    (b) separating the solution into a precipitate and a supernatant, whereby the supernatant has enhanced (6,5) tubes.

4. A method for enhancing (6,5) chirality carbon nanotube separation, comprising the steps of:
    (a) mixing single wall carbon nanotubes with genomic DNA into a solution; and,
    (b) separating the solution into a precipitate and a supernatant, wherein the genomic DNA has a guanine-cytosine content of less than 50%.

* * * * *